(12) United States Patent
Stumpp

(10) Patent No.: US 8,590,875 B2
(45) Date of Patent: Nov. 26, 2013

(54) MACHINE HAVING AN AIR BEARING AND METHOD FOR OPERATING SUCH A MACHINE

(75) Inventor: Ernst Stumpp, Koenigsbronn (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 0 days.

(21) Appl. No.: 13/552,852

(22) Filed: Jul. 19, 2012

(65) Prior Publication Data

US 2013/0181387 A1    Jul. 18, 2013

Related U.S. Application Data

(63) Continuation of application No. PCT/EP2011/050832, filed on Jan. 21, 2011.

(30) Foreign Application Priority Data

Jan. 21, 2010 (DE) .......................... 10 2010 006 297

(51) Int. Cl.
- B25B 1/22 (2006.01)
- H02K 33/00 (2006.01)
- H02P 5/00 (2006.01)
- G05B 1/06 (2006.01)
- B23Q 1/38 (2006.01)

(52) U.S. Cl.
USPC .............................. 269/71; 318/640; 318/114

(58) Field of Classification Search
USPC ............. 269/71; 318/640, 114, 600; 156/250, 156/580.1, 580.2, 538, 362, 215; 251/58, 251/63, 93
See application file for complete search history.

(56) References Cited

U.S. PATENT DOCUMENTS

| | | | | |
|---|---|---|---|---|
| 2,448,981 A | * | 9/1948 | Ingres | .......................... 91/376 R |
| 2,908,600 A | * | 10/1959 | Nicholson | ...................... 156/250 |
| 3,943,972 A | | 3/1976 | Bitonti et al. | |
| 3,948,344 A | * | 4/1976 | Johnson et al. | ............... 180/124 |

(Continued)

FOREIGN PATENT DOCUMENTS

| | | |
|---|---|---|
| DE | 80 31 939.7 | 6/1984 |
| DE | 34 41 426 A1 | 8/1985 |
| EP | 0 113 305 | 7/1984 |
| EP | 0 130 905 | 7/1987 |
| EP | 0 546 694 B1 | 2/1996 |
| EP | 0 701 663 B1 | 7/1998 |
| EP | 0 976 635 A2 | 2/2000 |
| GB | 778801 | 7/1957 |

OTHER PUBLICATIONS

IPEA/EP; English language translation of International Preliminary Report on Patentability (Chapter II); issued by WIPO Sep. 13, 2012; 8 pp.

*Primary Examiner* — Alvin Grant
(74) *Attorney, Agent, or Firm* — Harness, Dickey & Pierce, P.L.C.

(57) ABSTRACT

A machine has a frame structure for moving a machine head in one or more spatial directions. The frame structure comprises an actuator and an air bearing for moving the head. The machine also comprises a compressed air feed connected to the air bearing for providing a compressed air flow. A restrictor defines the compressed air flow to the air bearing. The machine has a first operating state, in which a high compressed air flow is defined and in which the actuator can be actuated. The machine has a second operating state, in which a compressed air flow lower than the high compressed air flow is defined. In the second operating state, the actuator is secured against actuation from a closed-loop position controller, while the closed-loop position controller is maintained in operation.

16 Claims, 2 Drawing Sheets

(56) References Cited

U.S. PATENT DOCUMENTS

| | | | |
|---|---|---|---|
| 4,272,311 A * | 6/1981 | D'Angelo et al. | 156/215 |
| 4,851,178 A * | 7/1989 | Wendt | 264/547 |
| 5,174,004 A * | 12/1992 | King et al. | 29/251 |
| 5,207,854 A * | 5/1993 | Becking | 156/350 |
| 5,344,292 A * | 9/1994 | Rabenau et al. | 417/413.1 |
| 6,418,601 B1 * | 7/2002 | Olden et al. | 29/281.3 |
| 6,536,499 B2 * | 3/2003 | Voorhees et al. | 156/538 |
| 6,818,098 B2 * | 11/2004 | Sato et al. | 156/580.2 |
| 7,849,725 B1 * | 12/2010 | Nelson et al. | 73/12.05 |
| 2003/0173533 A1 * | 9/2003 | Baumann | 251/58 |
| 2004/0065415 A1 * | 4/2004 | Sato et al. | 156/580.1 |

\* cited by examiner

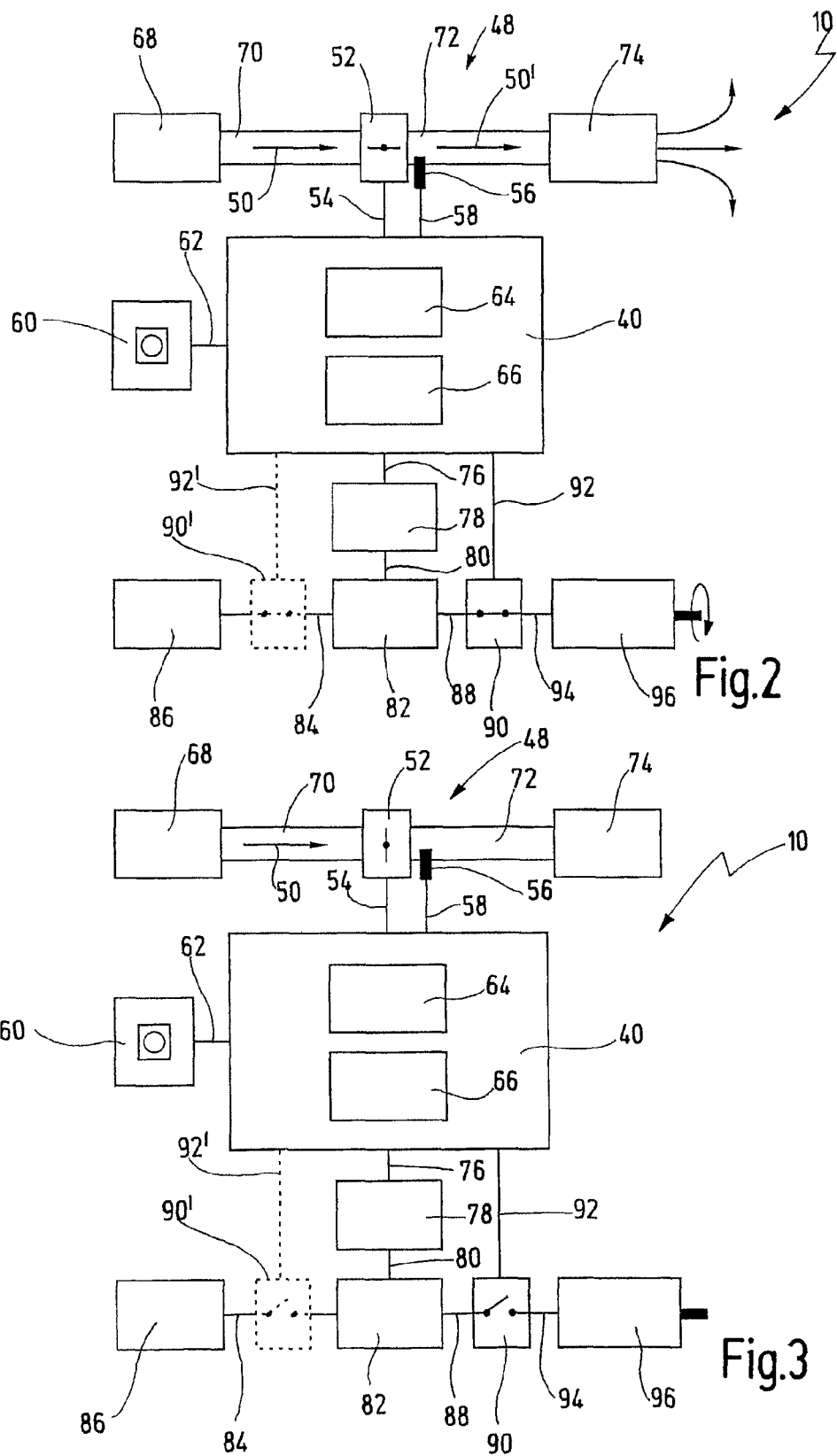

MACHINE HAVING AN AIR BEARING AND METHOD FOR OPERATING SUCH A MACHINE

CROSSREFERENCES TO RELATED APPLICATIONS

This application is a continuation of international patent application PCT/EP2011/050832 filed on Jan. 21, 2011 designating the U.S., which international patent application has been published in German language and claims priority from German patent application DE 10 2010 006 297.9 filed on Jan. 21, 2010. The entire contents of these priority applications are incorporated herein by reference.

BACKGROUND OF THE INVENTION

The present invention relates to a machine having a moveable machine part and an air bearing supporting the moveable machine part. Moreover, the invention relates to an advantageous method for operating such a machine.

Many machines, in particular machine tools and coordinate measuring machines, have a displaceable working head. In the case of a coordinate measuring machine, on which the following will be based by way of example, the head is often arranged on the lower free end of a vertically arranged quill. The quill is displaceable, so that the head can be displaced relative to a measurement table. The measurement table is designed to support a measurement object. The quill is often arranged on a crossbar of a gantry, and it can be displaced along the crossbar in a first horizontal direction by means of a carriage. The gantry can be displaced together with the quill in a second horizontal direction, so that the measurement head can be displaced overall in three mutually perpendicular spatial directions. The quill, the carriage and the gantry form a frame structure. The maximum displacement paths of the measurement head along the three movement directions define a measurement volume, inside of which spatial coordinates on a measurement object can be determined.

In order to carry out a measurement, the measurement object is arranged in the measurement volume of the coordinate measuring machine. This is done in a first spatial position of the measurement object, relative to the measurement head. The measurement head is subsequently displaced to selected measurement points on the measurement object, in order to survey the measurement object. To this end, the coordinate measuring machine comprises actuators which move the gantry, the carriage and the quill in the respective spatial direction when actuated. Stepper motors or servomotors are typically used as actuators, since these allow very exact positioning of the measurement head. Since a very high accuracy is required when displacing the measurement head in coordinate measuring machines, the moving parts of the frame structure are supported without friction with respect to one another by means of air bearings. Air bearings, or aerostatic bearings, produce an air gap between the parts supported with respect to one another by blowing compressed air between the parts. In this way, an air cushion is formed between the parts supported with respect to one another, which prevents friction between these parts.

DE 34 41 426 A1 describes a coordinate measuring machine in gantry design, which comprises air bearings. During operation, compressed air from a compressed air source is to be blown into the air bearing through a tube and a restrictor bore. The compressed air flows through between the components supported with respect to one another and, owing to its pressure effect, creates a spacing in the form of a gap between the components. When this achieved, the gantry can be displaced so that a measurement head arranged on the gantry can be displaced with respect to a measurement object.

Typically, air bearings are constantly supplied with compressed air during operation of a machine, so that the head can be displaced in order to survey a measurement object or in order to process a workpiece. During times when the machine is static, the air bearings continue to be supplied with compressed air in order to prevent damage. This would happen if the air bearings are insufficiently supplied with compressed air and the head is displaced. In this case, the parts to be supported with respect to one another rest on one another, so that friction occurs between the parts. If the head is displaced in this situation, this leads to damage between the parts owing to the friction. It can also cause damage to the actuators, which may be overloaded because of the friction. In the event of long static times, the disadvantage arises that the measuring devices are contaminated by the compressed air. This happens in particular at abutting surfaces of multi-part measuring devices.

Switching off the machine completely during static times has the disadvantage that the machine has to be switched on again for renewed operation. This requires a series of initialization steps. First, the air bearings have to be supplied sufficiently with compressed air. Then, a present position of the head needs to be determined for control. Furthermore, the control must be adapted to present thermal conditions of the machine. Such initialization steps require time, which increases the static time of the machine and thereby reduces the availability of the machine.

German utility model registration G 80 31 939.7 proposes a height measurement and marking apparatus, which has a displaceable apparatus base. For displacement, the apparatus base is supported on an air cushion which is supplied by a compressed air feed. When the compressed air feed is interrupted, the apparatus base is lowered onto an aligning plate. In order to allow the apparatus base still to be moved smoothly, rollers are provided on the lower side of the apparatus base, which rest on the aligning plate after the step of lowering.

U.S. Pat. No. 3,943,972 discloses a pneumatic circuit for industrial applications. A compressed air feed is connected via switching valves to pneumatic cylinders. The switching valves comprise solenoid switches, which determine a switching position of the switching valves. By actuating a manual switch, the switching positions can be modified so that the cylinders are supplied with compressed air. Furthermore, a pneumatically controlled switch-off valve is arranged between a compressed air source and the cylinders, the switching position of said switch-off valve depends on a control pressure. This switch-off valve can provide a compressed air feed to the cylinders or interrupt it. In order to control the switching position of the switch-off valve, a delay component in the form of a compressed air chamber and a compressed air restrictor is provided. When the manual switch is actuated, the delay component is supplied with compressed air. If the manual switch is not actuated, air escapes from the delay component so that an air pressure inside the delay component decreases and therefore the control pressure at the switch-off valve is reduced, until the switching position of the switch-off valve changes. A timeout is therefore produced between the compressed air source and compressed air cylinders.

EP 0 546 694 also discloses a pneumatic circuit which switches off a compressed air feed to a cylinder after a certain time. This time delay is likewise based on the use of a delay component which is established in the form of a compressed air chamber and a restrictor.

During operation of such machines, safety devices are often used for protecting the user against hazards and/or the machine against damage. For safety reasons, actuators may not be automatically switched on after a complete switch-off. Usually, compressed air monitoring means are used in order to completely switch off the entire machine in the event of a pressure drop or lack of compressed air flow. Error monitoring means are furthermore used, which detect an excessive current in electrical actuators or position lags, i.e. errors between desired and actual positions. Response of each of these safety devices typically leads to the machine being switched off and countermeasures for restarting the machine have to be carried out by a user. The static time of the machine is therefore increased until the countermeasures are completed. For example, interrupting the compressed air would mean that the air monitoring switches off the machine when the air bearings are undersupplied with compressed air in order to prevent damage. Automatic restart of the machine is not possible then, so that a user has to restart the machine manually and carry out the initialization steps mentioned above.

During the initialization steps, a current position of the head may not coincide with an assumed position of a closed-loop position controller for the head. In the initialization, this may lead either to the closed-loop position controller having to be reinitialized or to the head being moved abruptly into the desired position specified by the closed-loop position controller. This can cause position lags, which lead to measurement errors or defective workpieces.

SUMMARY OF THE INVENTION

Against this background, it is an object of the present invention to provide a machine and a method for operating a machine, which reliably and straightforwardly permit high availability of the machine while allowing to save compressed air.

According to one aspect, there is provided a machine comprising a frame structure comprising at least one actuator and at least one air bearing, comprising a head moveably arranged on said frame structure via said air bearing, said actuator being configured to move the head, comprising a compressed air feed connected to the air bearing for providing a compressed air flow for the air bearing, comprising a restrictor configured to define the compressed air flow to the air bearing, comprising a control and evaluation unit configured to selectively control the restrictor in order to define a first compressed air flow in a first operating state and to define a second compressed air flow in a second operating state, with the second compressed air flow being substantially lower than the first compressed air flow, and comprising a closed-loop position controller designed to control a position of the head by driving the actuator, wherein the control and evaluation unit is further configured to secure the actuator against actuation in the second operating state, thereby preventing the actuator from being driven by the closed-loop position controller, and wherein the closed-loop position controller is in full operation both in the first operating state and in the second operating state as well According to another aspect, there is provided a machine comprising a frame structure on which a head is arranged, the frame structure having an actuator and an air bearing for displacing the head, comprising a compressed air feed connected to the air bearing and providing a compressed air flow for the air bearing, comprising a restrictor which defines the compressed air flow, comprising a first operating state in which a high compressed air flow is defined and in which the actuator can be actuated, comprising a control and evaluation unit designed to control the actuator, and comprising a second operating state in which a compressed air flow lower than the high compressed air flow is defined and the actuator is secured against actuation, wherein the control and evaluation unit is further designed to control the restrictor and to secure the actuator against actuation in the second operating state, and comprising a closed-loop position controller which controls a position of the head by means of the actuator, wherein the closed-loop position controller is in operation both in the first operating state and in the second operating state, and wherein securing of the actuator prevents the actuator from being actuated by an actuation attempt of the closed-loop position controller.

According to yet another aspect, there is provided a method for operating a machine having a frame structure on which a head is moveably arranged, wherein the frame structure comprises an actuator and an air bearing for moving the head, the method comprising the steps of providing a compressed air flow for the air bearing, establishing a first operating state, in which a first compressed air flow is defined and in which the actuator can be actuated in response to control signals from a closed-loop position controller, and establishing a second operating state, in which a second compressed air flow is defined by means of a restrictor, said second compressed air flow being substantially lower than the first compressed air flow, wherein the actuator is secured against actuation by the closed-loop position controller in the second operating state, and wherein the closed-loop position controller is maintained in operation in the first operating state and in the second operating state as well, wherein securing of the actuator prevents the actuator from being driven by the closed-loop position controller.

The new machine and method employ two different operating states which can be selectively used. The first operating state is distinguished in that the high compressed air flow is provided to the air bearing, so that the air bearing is supplied with compressed air sufficiently to achieve a good bearing effect. In the first operating state, furthermore, the actuator can be actuated in order to make it possible to displace the frame structure and therefore the head. In other words, in the first operating state the control and evaluation unit can drive the actuator and thereby control it in order to displace the frame structure and the head.

The second operating state is distinguished in that a lower compressed air flow is supplied to the air bearing. This compressed air flow is lower than the high compressed air flow of the first operating state. The effect achieved by this is that consumption of compressed air is reduced in comparison with the first operating state. Owing to the lower compressed air flow, the bearing effect of the air bearing is reduced. In order to avoid damage to the air bearing by actuation of the actuator, the actuator is secured by the control and evaluation unit against actuation in the second operating state. This means that the actuator is prevented from being actuated as long as the second operating state applies. Only a change from the second operating state to the first operating state makes it possible for the actuator to be actuated and therefore for the head to be displaced.

For example, the machine may be changed from the first operating state to the second operating state when a corresponding instruction is given by a user or another machine. In a manufacturing line, for example, the instruction for the transition may be given to the machine by a workpiece feeder machine, when there are no measurement objects which are intended to be surveyed by the machine. In this way, energy and compressed air will be saved when the machine is not needed.

In preferred embodiments, the machine has a frame structure comprising a gantry on which a carriage is arranged. In the preferred embodiments, the carriage carries a quill, on the end of which the head is arranged. In order to be able to displace the head, the gantry is moveably arranged on a table and frictionlessly supported by means of the air bearing. The gantry can be displaced by means of an actuator in a spatial direction. A further actuator and a further air bearing are provided on a crossbar of the gantry. The carriage can therefore be displaced in a second spatial direction. Correspondingly, the quill is moveably arranged on the carriage and supported by means of yet another air bearing. The gantry interacts with an additional actuator, which can move the quill in a third spatial direction. The air bearings are typically supplied with the compressed air flow by means of a common compressed air feed of the machine. In order to displace the head in the three spatial directions, the control and evaluation unit can preferably actuate all the actuators in the first operating state. Correspondingly, in the second operating state, the control and evaluation unit preferably cannot actuate any of the three actuators, in order to secure them.

Advantageously in this case, the control and evaluation unit is operable in both the first and second operating states, which obviates time-consuming initialization steps when changing from the first operating state to the second operating state and from the second operating state to the first operating state. In other words, the machine remains usable even when the actuators are secured and can automatically continue operation at any time and very rapidly, for example owing to an automatic change from the second operating state to the first operating state. In addition, it is advantageous that the amount of compressed air required can be reduced by the second operating state, since the compressed air flow is reduced in the second operating state compared with the first operating state. In this way, energy and costs for the consumption of compressed air can be reduced. It is also advantageous that operating noise of the machine is reduced by the lower compressed air flow in the second operating state. Owing to the lower output of compressed air in the region of the air bearings, exit noise is reduced. This leads to a more comfortable working environment for a user of the machine, and therefore provides significantly greater user acceptance. Another advantage is that contamination of measuring devices is reduced. In particular, this takes place at positions where the apparatus is stationary for a prolonged time or where a plurality of measuring scales of the measuring devices abut to one another forming a small gap. Another advantage is that already existing machines can also be upgraded in a straightforward way, so that even relatively old machines can be provided with the advantages mentioned. Furthermore, existing safety devices can be circumvented or adapted, without leading to reductions in safety.

In the present application, a machine is intended to mean a coordinate measuring machine, a machine tool or any kind of computer controlled machine employing air bearings. Depending on the configuration of the machine, the head is could be a measurement head, such as a touch probe head in particular, or a processing tool, for instance.

In a refinement, the compressed air flow in the second operating state is zero.

In this refinement, the restrictor is fully closed, so that the air bearing is pressureless. In this case, the parts supported by means of the air bearing rest on one another. It is advantageous that the maximum amount of compressed air can be saved in this case. It is also advantageous that the air bearings are noiseless, which leads to a particularly comfortable working environment. Furthermore, contamination of the measuring devices is minimized.

In another refinement, the compressed air flow in the second operating state is greater than zero.

According to this refinement, a reduced compressed air flow is provided in the second operating state. This is advantageous in particular when the machine comprises compressed air monitoring, which would completely switch off the entire machine in the event of a pressure drop or lack of compressed air flow. The fact that the compressed air flow is not completely switched off prevents the compressed air monitoring from completely shutting down the machine. A particularly rapid transition from the second operating state to the first operating state is therefore possible. Furthermore, the advantages of the reduction in consumption and the noise reduction are thereby simultaneously achieved.

In another refinement, the actuator is an electrical drive.

In this configuration, the actuator is formed as an electrical drive, in particular as an electric motor, and more preferably as a stepper motor or servomotor. Such a motor can be controlled in a very straightforward way and secured very easily against actuation. Further advantages of the electrical drive are rapid and exact movement as well as low operating noise.

In another refinement, a switching device is provided which switches an electrical current supply to the electrical drive, wherein the current supply is connected to the electrical drive in the first operating state and wherein the current supply is separated from the electrical drive in the second operating state, in order to secure the electrical drive against actuation.

In this refinement, the electrical drive is secured against actuation by interrupting the electrical current supply to the drive. This is a very simple and effective measure for securing the drive against actuation. In particular, the switching device may be controlled by the control and evaluation unit. This is advantageously carried out by the control and evaluation unit switching the electrical current supply to the electrical drive for the first operating state and interrupting the electrical current supply to the electrical drive for the second operating state. Another effect achievable by this is that the control and evaluation unit can remain in operation and at the same time the status of the electrical drive in the second operating state remains unchanged. This has the advantage that no initialization steps relating to the present position of the head are required during the transition from the second operating state to the first operating state. In this way, the time outlay for this initialization steps can be saved. Suitable switching devices are, in particular, contactors or relays which are available for industrial purposes and can be used economically.

In another refinement, the switching device switches the current supply from a power amplifier stage to the electrical drive.

In this embodiment, the machine comprises a power amplifier stage which supplies the electrical drive with electrical current. The effect achieved by the switching between the power amplifier stage and the electrical drive is that the current supply can be switched off while the power amplifier stage continues to be supplied with current. This has the advantage that the power amplifier stage maintains its operating temperature. This avoids accuracy losses when actuating the electrical drive in the first operating state owing to cooling of the power amplifier stage in the second operating state.

In another refinement, the switching device switches the current supply from a current source to a power amplifier stage.

In this configuration, the switching device is arranged between the current source and the power amplifier stage. The switching device can therefore switch off the power amplifier stage for the second operating state. In this way, more electrical energy can be saved.

In another refinement, a closed-loop position controller is provided which controls a position of the head by means of the actuator, wherein the closed-loop position controller is in operation both in the first and in the second operating state.

In this refinement, a closed-loop position controller is provided which controls the position of the head. To this end, the closed-loop position controller comprises a detector for detecting an instantaneous position of the head. The value determined, i.e. an actual position, is compared with a setpoint position specified by the control and evaluation unit. By determining a control deviation between the actual and setpoint positions, the position of the head can be adjusted to the setpoint position by actuating the actuator. Continuous operation of the closed-loop position controller in both the first and second operating states prevents initialization steps from having to be carried out with respect to the closed-loop position controller during transitions between the operating states. The corresponding time outlay for the initialization steps is therefore saved. "In operation" means that the closed-loop position controller continues to perform its control operations and it compares the setpoint position with the actual position in both the first and second operating states. Securing of the actuator prevents the actuator from being actually moved by an actuation attempt of the closed-loop position controller. In other words, the closed-loop position controller runs "idle". In this way, an undesired difference between the actual and setpoint positions of the head can be prevented and jumping of the head during a transition from the second to first operating states can therefore be prevented.

In a preferred embodiment, the closed-loop position controller has a first mode and a second mode, which are executed as a function of the operating states. The first mode is executed in the first operating state and corresponds to normal operation of the closed-loop position controller. The second mode is executed in the second operating state. In this mode, the closed-loop position controller is modified in such a way that either the safety devices are switched off or the safety devices are prevented from triggering by sending modified data. The closed-loop position controller may furthermore be adapted in the second mode in such a way that it is limited in its control variable (anti-windup), so that disproportionally large control variables are not transmitted from the closed-loop position controller to the actuator during a transition from the second operating state to the first operating state. The effect achieved by the use of the two modes is thus that the safety device does not respond and the machine is therefore not fully switched off.

In another refinement, a time control is provided which triggers a transition from the first operating state to the second operating state.

In this refinement, the control and evaluation unit sets the operating states. The transition from the first operating state to the second operating state is triggered on the basis of the time control. For example, the time control triggers the transition at a predetermined time. This is advantageous when times at which the machine is not used are known. In this case, the machine can be rapidly brought into the second operating state. In addition or as an alternative, the time control may take place on the basis of time monitoring. For example, it is conceivable to form the time control so that a predetermined period of time must elapse, during which the head is not displaced or at least an actuator receives no displacement instructions. After this period of time has elapsed, the transition from the first operating state to the second operating state is triggered. In this case, it is advantageous that the machine is automatically brought into the second operating state without a user having to intervene. In this way, compressed air and energy savings are maximized.

In another refinement, an input device is provided which when actuated triggers a transition from the second operating state to the first operating state.

In this refinement, an input device is used for generating an instruction for a transfer from the second operating state to the first operating state. The input device may for example be a button (button switch), which is actuated by a user when he wants to use the machine. It is also conceivable for the input device to receive data from another machine, such as a workpiece feeder machine. This may for example be the case in a manufacturing line when the workpiece feeder machine provides measurement objects or workpieces to be processed or surveyed. In this way, the machine is set into the first operating state only when the machine is actually used.

In another refinement, the input device is a joystick for actuating the actuator.

In this refinement, the machine has a joystick. Typically, such joysticks are manipulated by a user for manually moving the head. In order to permit rapid operation of the machine, it is advantageous for the machine to automatically enter the first operating state when the joystick is actuated. The user therefore does not need to have any knowledge of the second operating state and can operate the machine as usual, with compressed air and energy savings being achieved at the same time.

In another refinement, the restrictor is a solenoid valve.

In this refinement, the restrictor is formed as a solenoid valve. The solenoid valve can be driven in a straightforward way by the control and evaluation unit. Furthermore, such solenoid valves are available for industrial purposes, so that an economic advantage is obtained.

In another refinement, the compressed air feed comprises a compressed air sensor.

In this embodiment, the compressed air flow is monitored inside the compressed air feed by means of a pressure sensor. In particular, the compressed air sensor is connected to the control and evaluation unit. For monitoring the compressed air flow, pressure sensors may be used which are arranged between the restrictor and the air bearing. The control and evaluation unit can therefore detect when the high compressed air flow is defined and when the lower compressed air flow is defined. In this way, it is possible to determine which operating state the machine is in and additional safety measures may be implemented. As an alternative or in addition, with the aid of the recorded data it is possible to establish which static times and which operating time are generated by the machine. It is therefore possible to record costs, cost savings and machine utilization. It is furthermore possible to form the compressed air sensor as a flow sensor, which measures the compressed air flow itself. The flow sensor has the advantage that it can be arranged fluidically either upstream or downstream of the restrictor in the compressed air feed.

It is to be understood that the features mentioned above and those yet to be explained below may be used not only in the respectively indicated combination but also in other combinations or separately, without departing from the scope of the invention.

BRIEF DESCRIPTION OF THE DRAWINGS

Exemplary embodiments of the invention are represented in the drawing and will be explained in more detail in the follow description below.

FIG. 2 shows a schematic representation of relevant components of the machine in FIG. 1 in a first operating state, and FIG. 3 shows the schematic representation of FIG. 2 in a second operating state.

DESCRIPTION OF PREFERRED EMBODIMENTS

Figure 1:
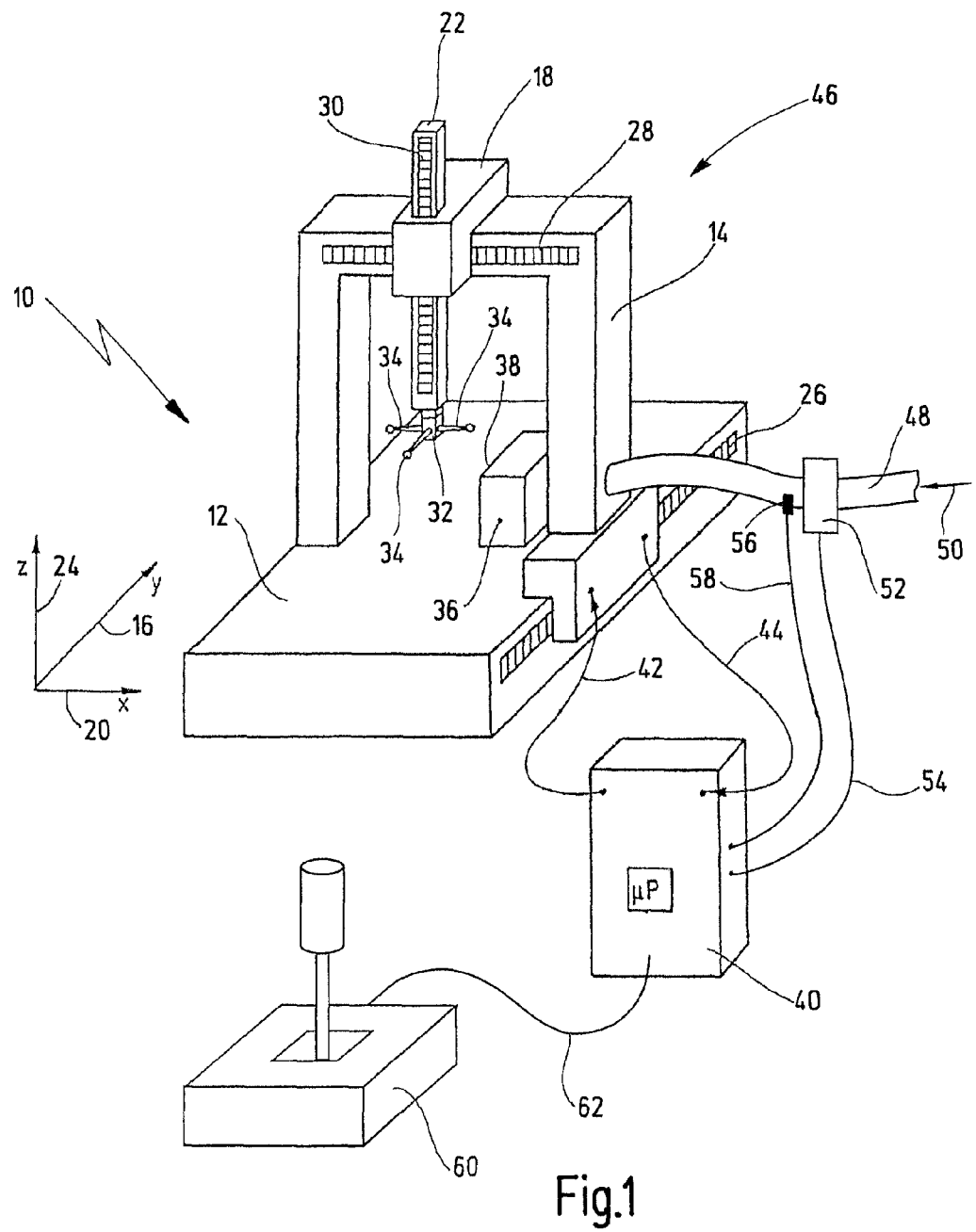
FIG. 1 shows an exemplary embodiment of the new machine, here in the form of a preferred coordinate measuring machine.

In FIG. 1, a coordinate measuring machine is denoted in its entirety by reference number 10. The coordinate measuring machine 10 is represented here by way of example in gantry design. The invention is not, however, restricted to a particular frame structure and may also be used for coordinate measuring machines in another design. The coordinate measuring machine 10 serves here as an exemplary embodiment of a machine according to the invention. The invention is also not restricted to coordinate measuring machines, but may for example also be used for machine tools and other machines comprising air-supported parts.

The coordinate measuring machine comprises a base 12, on which a gantry 14 is arranged. The gantry 14 can be displaced with the aid of an electrical drive (not represented here) along a spatial direction 16, which is usually referred to as the y axis. On the upper crossbar of the gantry 14, a carriage 18 is arranged which can be displaced in a second spatial direction 20. The spatial direction 20 is usually referred to as the x direction. The carriage 18 carries a quill 22, which can be displaced in a third spatial direction 24. The spatial direction 24 is usually referred to as the z direction. The reference numbers 26, 28 and 30 denote measuring elements, with the aid of which a current spatial position of the gantry 14, the carriage 18 and the quill 22 can be determined. Typically, the measuring elements 26, 28 and 30 are graduated glass scales, which are read with the aid of suitable sensors.

A head, in the form of a touch probe head 32 comprising styli 34, is arranged at the lower free end of the quill 22. The styli 34 are in this case assigned to one of the three spatial directions 16, 20 and 24, and they extend parallel to the corresponding spatial directions. The styli 34 each have a ball at their free ends. The purpose of the ball is to make contact to a measurement object 36 at a measurement position 38. The measurement object 36 is schematically represented here. With the aid of the measuring elements 26, 28 and 30, measurement values can be determined with respect to a position of the probe head 32 when the measurement position 38 is touched. The spatial coordinates of the measurement position 38 are determined as a function thereof.

Reference number 40 denotes a control and evaluation unit. The control and evaluation unit 40 is used on the one hand to control the electrical drive for the movement of the probe head 32 along the three spatial directions 16, 20, 24. On the other hand, the control and evaluation unit 40 reads measurement values from the measuring elements 26, 28 and 30. It furthermore determines spatial coordinates of the measurement position 38 as a function of the measurement values and as a function of excursions of the styli 34. To this end, the control and evaluation unit 40 is connected to the gantry 14, as shown by means of lines 42 and 44.

The gantry 14, the carriage 18 and the quill 22 together form a frame structure 46, which is used to move the probe head 32. In order to avoid mechanical friction between the measurement table 12, the gantry 14, the carriage 18 and the quill 22, air bearings (not represented here) are provided between each two of the components. The air bearings are supplied with compressed air flow 50 from a compressed air feed 48. The compressed air feed 48 is only partially represented in FIG. 1. On the compressed air feed 48, a solenoid valve 52 is provided which can be driven by the control and evaluation unit 40 via line 54. The solenoid valve 52 defines the strength of the compressed air flow delivered to the air bearings. Inside the compressed air feed 48, a compressed air sensor is provided in the form of a pressure sensor 56 (alternatively, for example, a flow sensor). The pressure sensor 56 measures an air pressure inside the compressed air feed 48. The acquired values are forwarded via line 58 to the control and evaluation unit 40. With the aid of the acquired values, the control and evaluation unit 40 can establish whether compressed air is being delivered to the air bearings, and if so in what quantity. It is furthermore possible to record the compressed air flow 50 by means of the pressure sensor 56, in order to be able to carry out evaluations on the basis of the compressed air consumption. The coordinate measuring machine 10 furthermore comprises a joystick 60, which is connected via line 62 to the control and evaluation unit 40. The joystick 60 serves as an input device for a user. The latter can use the joystick 60 for moving the probe head 32.

FIG. 2 shows a schematic representation of relevant components of the coordinate measuring machine 10 in a first operating state. The control and evaluation unit 40 comprises a time control 64, which triggers a transition from the first operating state to a second operating state after a predetermined period of time has elapsed. The period of time starts when the probe head 32 is no longer displaced and/or the actuators no longer receive any displacement instructions. If the probe head 32 is displaced within this period of time, the period of time starts to run again. The control and evaluation unit 40 further comprises a closed-loop position controller 66, which determines a current position of the probe head 32 by means of the measuring elements (not represented here), compares it with a setpoint position and, as a function of a difference between the current and setpoint positions, generates a control signal for the electrical drives. The closed-loop position controller 66 therefore adjusts the actual position of the probe head as a function of a difference between the current and setpoint positions of the probe head. A value for the setpoint position may, for example, be determined by a user or by a computer program which runs in the control and evaluation unit 40. Via line 54, the control and evaluation unit 40 controls the solenoid valve 52, which is fully open in the first operating state. The solenoid valve 52 is supplied with the compressed air flow 50 from a compressed air source 68 by a pipe 70. Because the solenoid valve 52 is open, the compressed air flow 50 is forwarded into a pipe 72, which provides the compressed air flow 50' for an air bearing 74. Owing to the high compressed air flow 50', the air bearing 74 can perform a bearing action. It is therefore possible to displace the frame structure 46 in the spatial directions 16, 20 and 24, without damage occurring between the individual components of the frame structure 46.

From the control and evaluation unit 40, a line 76 extends to a power regulator 78. The power regulator 78 implements control signals of the closed-loop position controller 66 in an electrical power circuit. The power regulator 78 is to this end connected via line 80 to a power amplifier stage 82. The power amplifier stage 82 is supplied with electrical current from a current source 86 via an electrical line 84. Starting from the power amplifier stage 82, an electrical line 88 extends to a switching device 90, which is represented in a closed switching position. The switching position can be set by the control and evaluation unit 40 via line 92. Starting from the switching device 90, a further electrical line 94 extends to a servomotor 96. Because of the closed switching position of the switch 90, the servomotor 96 can transfer the control signals of the closed-loop position controller 66 into a machine movement. The control and evaluation unit 40 can therefore actuate the servomotor 96 in order to displace the probe head 32.

In the electrical line 84, a second switching device 90' is arranged which is connected via line 92' to the control and evaluation unit 40. The switching device 90' is an alternative or additional switching device 90' to the switching device 90. The switching device 90' and the line 92' are therefore represented by dashes. In the first operating state, the switching device 90' has a closed switching position, so that the power amplifier stage 82 and the servomotor 96 can be supplied with current.

When the predetermined period of time elapses in the time control 64, the coordinate measuring machine 10 changes over from the first operating state to the second operating state.

FIG. 3 shows the relevant components of the coordinate measuring machine 10 in the schematic representation of FIG. 2 in the second operating state. In contrast to the first operating state, the solenoid valve 52 is fully closed here in the second operating state. This prevents the compressed air flow 50 from being forwarded to the air bearing 74. The air bearing 74 is therefore pressureless and does not perform any bearing action. The switching device 90 is furthermore opened. Owing to the open switching position, the servomotor 96 is not supplied with current. The servomotor 96 is therefore secured against actuation by the control and evaluation unit 40. It is therefore not possible for the frame structure 46 to be displaced, and for damage to occur between the individual components of the frame structure 46 owing to the lack of bearing action. It furthermore prevents the servomotor 96 from being overloaded, and therefore damaged, during actuation owing to the friction inside the frame structure 46.

The alternative or additional switching device 90' is likewise shown in an open switching position. It is clear that, owing to the series connection of the switching devices 90 and 90', only one of the two switching devices 90, 90' needs to be opened in order to secure the servomotor 96.

For a transition from the second operating state to the first operating state, a user gives a movement instruction to the control and evaluation unit 40 by means of joystick 60, or the movement instructions are sent to the actuators, which then sets up the first operating state.

The effect achieved in this way is that it is possible to switch very rapidly to and fro between the first and second operating states, so that compressed air and current consumption in the coordinate measuring machine is minimized.

In the second operating state, the position control 66 and advantageously also the power regulation 78 continue to be active here. This means that the closed-loop position controller 66 continues to send control signals to the power regulator 78. The latter then transfers further control signals to the power amplifier stage 82. Maintaining the regulating processes in the closed-loop position controller 66 prevents initialization of the closed-loop position controller 66 from having to be carried out during a transition from the second operating state to the first operating state, so that the coordinate measuring machine 10 can be brought into the first operating state very quickly. This leads to very high availability of the coordinate measuring machine 10, with simultaneous saving on compressed air and energy.

What is claimed is:

1. A machine comprising:
   a frame structure comprising at least one actuator and at least one air bearing,
   a head moveably arranged on said frame structure via said air bearing, said actuator being configured to move the head,
   a compressed air feed connected to the air bearing for providing a compressed air flow for the air bearing,
   a restrictor configured to define the compressed air flow to the air bearing,
   a control and evaluation unit configured to selectively control the restrictor in order to define a first compressed air flow in a first operating state and to define a second compressed air flow in a second operating state, with the second compressed air flow being substantially lower than the first compressed air flow, and
   a closed-loop position controller designed to control a position of the head by driving the actuator,
   wherein the control and evaluation unit is further configured to secure the actuator against actuation in the second operating state, thereby preventing the actuator from being driven by the closed-loop position controller, and
   wherein the closed-loop position controller is in full operation both in the first operating state and in the second operating state as well.

2. The machine of claim 1, wherein the second compressed air flow corresponds to zero.

3. The machine of claim 1, wherein the second compressed air flow is greater than zero.

4. The machine of claim 1, wherein the actuator is an electrical drive.

5. The machine of claim 4, further comprising a switching device for switching an electrical current supply to the electrical drive, wherein the current supply is connected to the electrical drive in the first operating state and wherein the current supply is separated from the electrical drive in the second operating state in order to secure the electrical drive against actuation.

6. The machine of claim 5, further comprising a power amplifier stage, wherein the switching device is arranged between the power amplifier stage and the electrical drive.

7. The machine of claim 5, further comprising a current source and a power amplifier stage, wherein the switching device is arranged between the current source and the power amplifier stage.

8. The machine of claim 1, further comprising a time control, which automatically triggers a transition from the first operating state to the second operating state.

9. The machine of claim 1, further comprising an input device, which when actuated triggers a transition from the second operating state to the first operating state.

10. The machine of claim 9, wherein the input device is a joystick for manually actuating the actuator.

11. The machine of claim 1, wherein the restrictor is a solenoid valve.

12. The machine of claim 1, wherein the compressed air feed comprises a compressed air sensor connected to the control and evaluation unit.

13. A machine comprising a frame structure on which a head is arranged, the frame structure having an actuator and an air bearing for displacing the head, comprising a compressed air feed connected to the air bearing and providing a compressed air flow for the air bearing, comprising a restrictor which defines the compressed air flow, comprising a first operating state in which a high compressed air flow is defined and in which the actuator can be actuated, comprising a control and evaluation unit designed to control the actuator, and comprising a second operating state in which a compressed air flow lower than the high compressed air flow is defined and the actuator is secured against actuation, wherein the control and evaluation unit is further designed to control the restrictor and to secure the actuator against actuation in the second operating state, and comprising a closed-loop position controller which controls a position of the head by means of the actuator, wherein the closed-loop position controller is in operation both in the first operating state and in the second operating state, and wherein securing of the actuator prevents the actuator from being actuated by an actuation attempt of the closed-loop position controller.

14. The machine of claim 13, wherein the actuator is an electrical drive.

15. The machine of claim 14, further comprising a switching device for switching an electrical current supply to the electrical drive, wherein the current supply is connected to the electrical drive in the first operating state and wherein the current supply is separated from the electrical drive in the second operating state in order to secure the electrical drive against actuation.

16. A method for operating a machine having a frame structure on which a head is moveably arranged, wherein the frame structure comprises an actuator and an air bearing for moving the head, the method comprising the steps of:
   providing a compressed air flow for the air bearing,
   establishing a first operating state, in which a first compressed air flow is defined and in which the actuator can be actuated in response to control signals from a closed-loop position controller, and
   establishing a second operating state, in which a second compressed air flow is defined by means of a restrictor, said second compressed air flow being substantially lower than the first compressed air flow,
   wherein the actuator is secured against actuation by the closed-loop position controller in the second operating state, and
   wherein the closed-loop position controller is maintained in operation in the first operating state and in the second operating state as well,
   wherein securing of the actuator prevents the actuator from being driven by the closed-loop position controller.

* * * * *